United States Patent
Hildebrandt et al.

(10) Patent No.: US 12,436,511 B2
(45) Date of Patent: Oct. 7, 2025

(54) METHOD AND SYSTEM FOR SEMI-AUTOMATIC COMPLETION OF AN ENGINEERING PROJECT

(71) Applicant: Siemens Aktiengesellschaft, Munich (DE)

(72) Inventors: Marcel Hildebrandt, Munich (DE); Serghei Mogoreanu, Munich (DE); Mitchell Joblin, Surrey (CA); Martin Ringsquandl, Raubling (DE); Chandra Sekhar Akella, Madison, AL (US)

(73) Assignee: Siemens Aktiengesellschaft, Munich (DE)

( * ) Notice: Subject to any disclaimer, the term of this patent is extended or adjusted under 35 U.S.C. 154(b) by 329 days.

(21) Appl. No.: 18/113,224

(22) Filed: Feb. 23, 2023

(65) Prior Publication Data

US 2023/0273573 A1    Aug. 31, 2023

(30) Foreign Application Priority Data

Feb. 28, 2022   (EP) ..................................... 22159221

(51) Int. Cl.
*G05B 13/02*   (2006.01)
(52) U.S. Cl.
CPC .................. *G05B 13/027* (2013.01)
(58) Field of Classification Search
CPC .................................................. G05B 13/027
See application file for complete search history.

(56) References Cited

U.S. PATENT DOCUMENTS

2021/0110436 A1   4/2021   Sankar et al.
2022/0075605 A1*  3/2022   Iyer ........................ G06N 20/00

FOREIGN PATENT DOCUMENTS

WO   2021037603 A1   3/2021

OTHER PUBLICATIONS

European Search Report dated Sep. 21, 2022 in priority European Patent Application No. 22159221.5.
Petar Velickovic et al., "Graph attention networks", in arXiv preprint arXiv:1710.10903, 2017.

(Continued)

*Primary Examiner* — Gary Collins
(74) *Attorney, Agent, or Firm* — Schmeiser, Olsen & Watts, LLP

(57) ABSTRACT

A database stores a set of items, with each item having technical attributes, and with each item representing a module that can be used in an engineering project of a first user, $u_1$. A feature encoder embeds each item based on its technical attributes into a low-dimensional vector space. Then, in a second step, a graph neural network pools over these item embeddings to compute an updated user embedding for the first user A decoder mapping then addresses the recommendation task by outputting recommendation scores for each item. That means, heuristically speaking, that the method and system lift the recommendation task to the level of technical attributes to overcome the sparsity problem caused by item sets that are not overlapping between user groups. Thus, when matching similar users, the method does not rely on users configuring exactly the same modules but rather on configured modules that are similar from a technical point of view.

10 Claims, 4 Drawing Sheets

(56) References Cited

OTHER PUBLICATIONS

Figure 1:
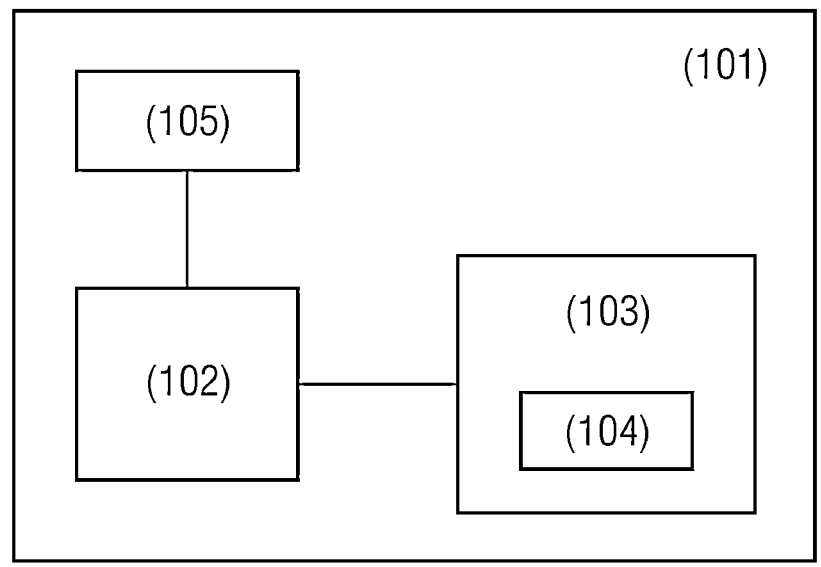

Hildebrandt, Marcel et al.; "A Recommender System for Complex Real-World Applications with Nonlinear Dependencies and Knowledge Graph Context"; European Semantic Web Conference, ESWC 2019; 16th International Conference, ESWC 2019, Portoroz, Slovenia, Jun. 2-6, 2019; Springer International Publishing, Cham; vol. 11503; Chap. 12; No. 558; pp. 179-193; XP047514176; DOI: 10.1007/978-3-030-21348-0 12; ISBN: 9783030213480; 2019.

Kipf, Thomas N. et al: "Semi-Supervised Classification with Graph Convolutional Networks"; Conference ICLR 2017; Feb. 22, 2017 (Feb. 22, 2017); XP055457092.

Jiancan Wu et al: "Graph Convolution Machine for Context-aware Recommender System", arxiv.org, Cornell University Library, 201 Olin Library Cornell University Ithaca, NY 14853, Jun. 10, 2020 (Jun. 10, 2020), XP081682137; 2020.

\* cited by examiner

METHOD AND SYSTEM FOR SEMI-AUTOMATIC COMPLETION OF AN ENGINEERING PROJECT

CROSS-REFERENCE TO RELATED APPLICATIONS

This application claims priority to EP Application No. 22159221.5, having a filing date of Feb. 28, 2022, the entire contents of which are hereby incorporated by reference.

FIELD OF TECHNOLOGY

The following relates to a method and system for semi-automatically completing an engineering project, in particular a complex engineering project such as an industrial automation system.

BACKGROUND

Over the past two decades, advancements in industrial automation have transformed the factory floors and processes in several industries, ranging from process industries (e.g., Oil and Gas, Power and Utilities, Water and Wastewater) to hybrid industries (e.g., Food and Beverage, Wind) to discrete industries (e.g., Automotive Manufacturing, Aerospace, Robotics).

Automating processes in any of these industries requires engineers to design and configure an industrial automation solution—in other words to complete an engineering project for a complex system, consisting of a multitude of individual modules, the interplay of which fulfills the functional requirements arising from the intended application. Selection of necessary modules is typically done using configuration software offered by their manufacturer.

Other examples of engineering projects include printed circuit boards and autonomous vehicles. These systems, like the industrial automation solutions described above, can be complex and comprise a multitude of different modules. The configuration of the complex engineering projects may comprise an iterative process, in which a user incrementally selects modules (hardware and software components for building the engineering project). The combination of these selected modules can fulfill functional requirements of the engineering projects while being also compatible with one another. The configuration of a complex engineering process is not an easy task and requires time, effort, experience, and a certain amount of domain-specific knowledge to be completed correctly by a user.

To alleviate information overload of a user performing such a complex engineering process, recommender systems are widely deployed to perform personalized information filtering in a variety of applications, including industrial ones, such as product configurators for engineering systems, simulation software for modeling and analysis of multi-domain systems, schematic drawing software, or clinical recommender systems in the health care domain.

Figure 3:
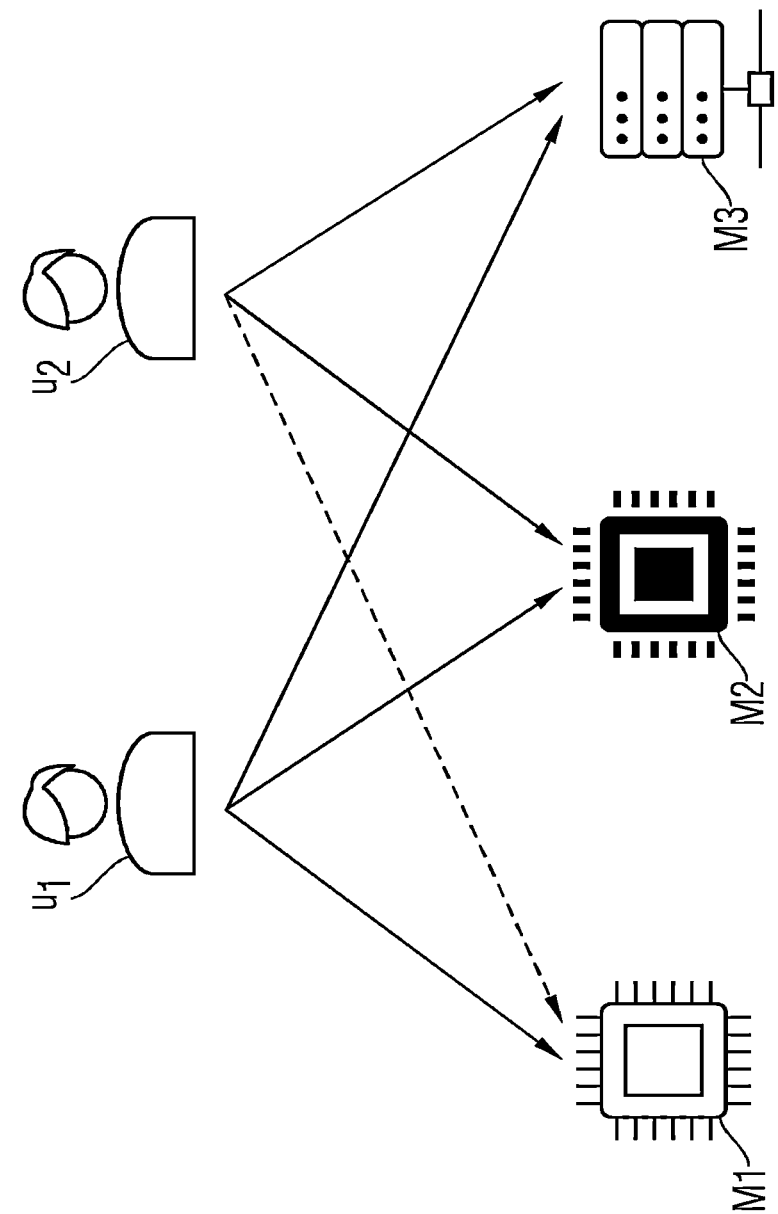

FIG. 3 shows a first user $u_1$ who has used a first module M1, a second module M2 as well as a third module M3 in his engineering projects. A second user $u_2$ has used only the second module M2 and the third module M3. Both users are similar because they have interactions in common (the second module M2 and the third module M3). In turn, a collaborative filtering algorithm can recommend the first module M1 to the second user $u_2$.

Collaborative filtering is the most popular recommendation technique. The underlying principle is to estimate how likely it is that a user will interact with an item based on historical interactions like purchases, clicks, or configuration data. Thereby, collaborative filtering techniques (implicitly) match similar users based on their revealed behavior and recommend observed interactions from these similar users.

Most collaborative filtering-based recommender systems rely on the assumption that each user can interact with the same items. However, in the context of industrial engineering configurators, it is often the case that groups of users have access to different subsets of modules. For example, this scenario is commonplace if users work for companies that each buy modules from distinct suppliers, or design engineering assets with varying intended real-world applications. This leads to a particular case of the sparsity problem for recommender systems, since there might be only a few common configurations (or even none) between users of different groups. In the extreme case where the set of configurable items between users does not intersect, it is impossible to identify similar behavior and preferences among users. In turn, most recommender systems based on collaborative filtering cannot make reasonable recommendations in this setting.

WO 2021037603 A1 discloses a recommendation engine to automatically provide recommendations in order to support a user in the completion of an engineering project. The entire contents of that document are incorporated herein by reference.

SUMMARY

An aspect relates to a method and system that provide an alternative to the state of the conventional art.

According to the computer implemented method for semi-automatic completion of an engineering project, the following operations are performed by components, wherein the components are software components executed by one or more processors and/or hardware components:

storing, in a database,
  a set of items, I, with each item, i∈I, having technical attributes, $x_i$, and with each item representing a module, and with each module being a hardware module and/or software module that can be used in an engineering project of a first user, $u_1$,
  a current state of the engineering project, with the current state including items that the first user, $u_1$, has already selected, and
  a user-item interaction graph
    representing each user, u, of a set of users, U, and each item, i, of the set of items, I, with a node, and
    representing observed interactions between users and items by edges between the respective nodes,
producing, by a feature encoder retrieving the technical attributes, $x_i$, of each item, i, from the database, an initial item embedding, $e_i^0$, for each item, i, which is a latent representation of the respective item, i, in latent space, with all of the initial item embeddings, $e_i^0$, forming an initial item embedding matrix, $I_0$,
processing, by a graph neural network operating on the user-item interaction graph,
  an initial user embedding for the first user, $e_{u_1}^0$,
  a first user neighborhood, $N_{u_1}$, and
  the initial item embedding matrix, $I^0$,
as input to compute an updated user embedding for the first user, $e_{u_1}^L$, with the initial user embedding of the first user $e_{u_1}^0$ being a latent representation of the first user, $u_1$, in latent space, with the first user neighborhood, $N_{u_1}$, being a set of items that the first user, $u_1$, has interacted with, processing, by the graph neural network operating on the user-item interaction graph, each initial item embedding, $e_i^0$, a neighborhood for each item, $N_i$, and an initial user embedding matrix, $U^0$, as input to compute updated item embeddings, $e_i^L$, with the neighborhood for each item, $N_i$, being a set of users that have interacted with the respective item, i, with the initial user embedding matrix, $U^0$, being formed by initial user embeddings, $e_u^0$, for each user, u, which are latent representations of the respective user, u, in latent space, processing, by a decoder mapping, the updated user embedding for the first user, $e_{u_1}^L$, and the updated item embeddings, $e_i^L$, as input in order to compute a recommendation score $s_{u_1,i}$ for each item, i, indicating a likelihood that the first user, $u_1$, needs the respective item, i, for completing his engineering project, forming a set of items (SI) by selecting items with the highest recommendation score $s_{u_1,i}$ outputting, by a user interface, the set of items (SI) to the first user, $u_1$, recognizing, by the user interface, a user interaction selecting an item from the set of items (SI), and automatically completing the engineering project by adding the selected item to the current state of the engineering project in the database.

The system for semi-automatic completion of an engineering project comprising the database, the feature encoder, the graph neural network, and the decoder mapping according to claim 1, wherein at least some of these components are hardware components, and wherein all of these components are configured for the execution of the respective operations according to claim 1.

The following advantages and explanations are not necessarily the result of the object of the independent claims. Rather, they may be advantages and explanations that only apply to certain embodiments or variants.

Latent space is a low-dimensional vector space. The database can be stored in RAM, on a hard disk or on a solid state drive, for example. The database can be implemented by simply storing a set of datasets, or by any other kind of database, for example a relational database or a graph database. Furthermore, the database can contain several databases, for example a graph database for the user-item interaction graph and a set of datasets for the other information.

In connection with embodiments of the invention, unless otherwise stated in the description, the terms "training", "generating", "computer-aided", "calculating", "determining", "reasoning", "retraining" and the like relate to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices or any other communication devices that can process data with computer support, processors and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

The method and system, or at least some of their embodiments, provide a novel recommender system that supports the user of an engineering configurator in choosing the appropriate modules. Given the complexity that is typically associated with the design process of engineering assets, the number of criteria to be taken into account and alternatives to be considered, the method and system, or at least some of their embodiments, can assist the engineer in configuring the solution in a timely manner. In particular, the method and system address the data sparsity problem that arises when groups of users interact with different sets of items that hardly intersect.

The method and system, or at least some of their embodiments, provide a hybrid recommender system that first embeds each item based on a set of technical attributes into a low-dimensional vector space. Then, in a second step, the system pools over these item embeddings to compute a representation for each user, and then addresses the recommendation task. That means, heuristically speaking, that the method and system lift the recommendation task to the level of technical attributes to overcome the sparsity problem caused by the non-overlapping item sets. Thus, when matching similar users, our method does not rely on users configuring exactly the same modules but rather on configured modules that are similar from a technical point of view.

By overcoming previously existing boundaries between knowledge gathered from users that are each engineering systems, a collaborative recommender system is provided.

Instead of training separate recommender systems for each group of users, the method and system, or at least some of their embodiments, allow for sharing information between groups of users, allowing all users to benefit from an increase in overall model performance since the recommender system has access to a larger training dataset. That unified larger training dataset is advantageous in comparison to a set of small, fragmented datasets and resulting individual recommender systems that are prone to overfitting (i.e., not being able to generalize beyond what was seen in the training dataset).

Furthermore, the method and system, or at least some of their embodiments, provide increased efficiency in disseminating product engineering knowledge across an organization since the groups of users using different items can learn from each other.

An embodiment of the method comprises the additional step of automatically producing the engineering project, in particular by printing the engineering project with a 3D printer, or by automatically assigning and configuring autonomous machines, in particular by installing and/or activating and/or configuring software modules, in order to realize the engineering project.

For example, if the engineering project is printable by a 3D printer, this step consists of automatically printing the engineering project with the 3D printer. If the engineering project is an industrial automation solution, this step consists of automatically assigning and configuring, by a suitable automation system, autonomous machines in order to implement the industrial automation solution.

An embodiment of the method comprises the initial steps of randomly initializing each initial user embedding, and randomly deleting items during a training phase in the user-item interaction graph, and optimizing the initial user embeddings, trainable parameters of the feature encoder, and parameters of the graph neural network according to a training objective, in order to produce high recommendation scores for the deleted items.

In another embodiment of the method, the decoder mapping computes the recommendation scores as the dot-product of the updated user embedding for the first user and the updated item embeddings.

In another embodiment of the method, the engineering project is an industrial engineering project, in particular an automation system.

In another embodiment of the method, the graph neural network consists of one or more layers, with each layer being a graph neural network.

A computer program product (non-transitory computer readable storage medium having instructions, which when executed by a processor, perform actions) with program instructions for carrying out a method according to one of the method claims.

BRIEF DESCRIPTION

Figure 2:
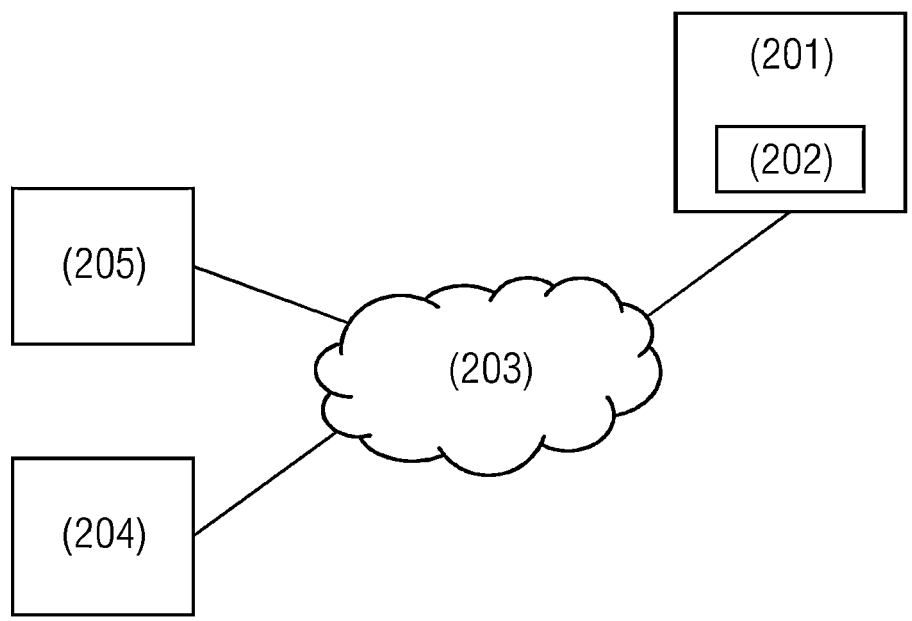
Figure 4:
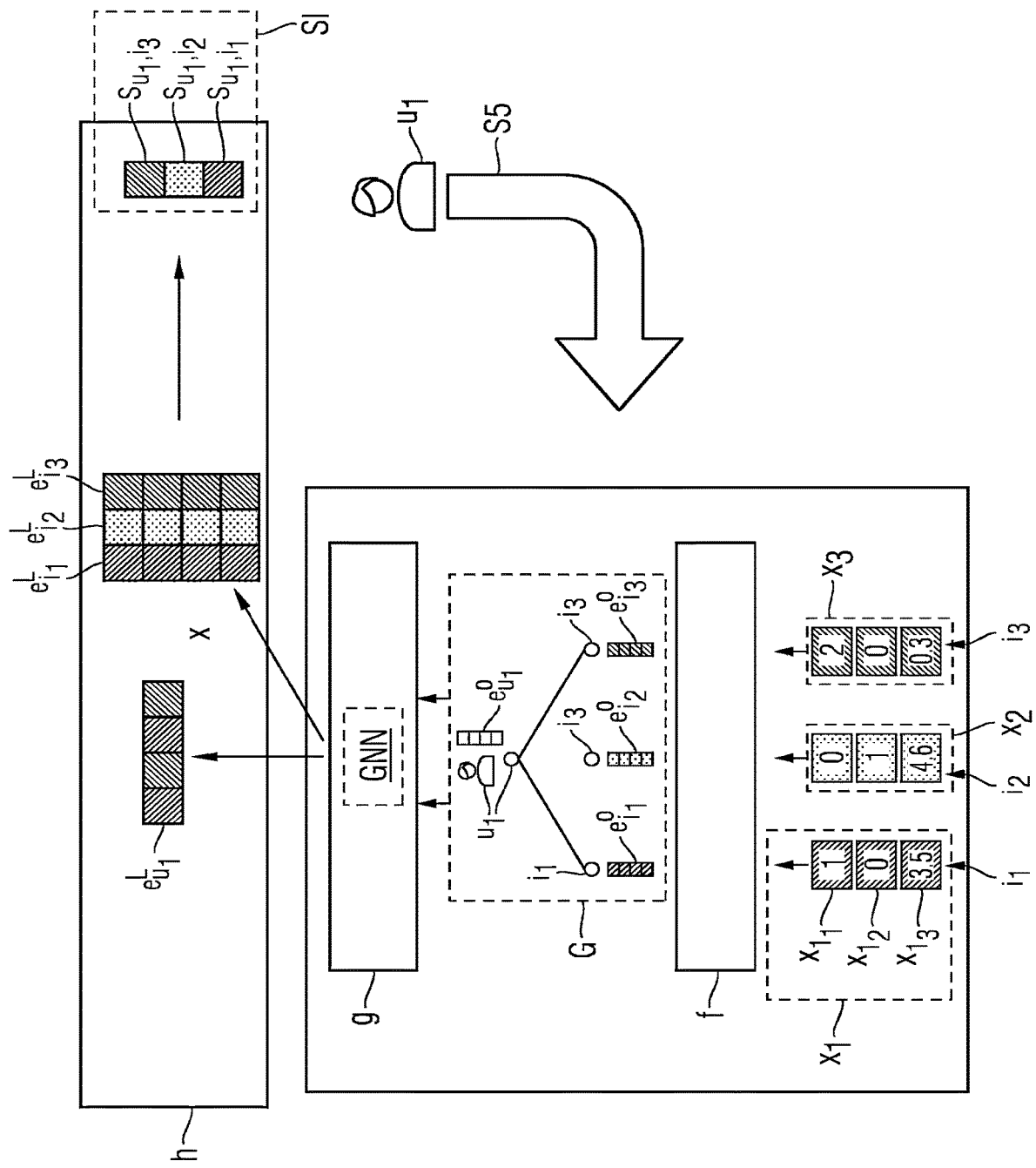
Figure 5:
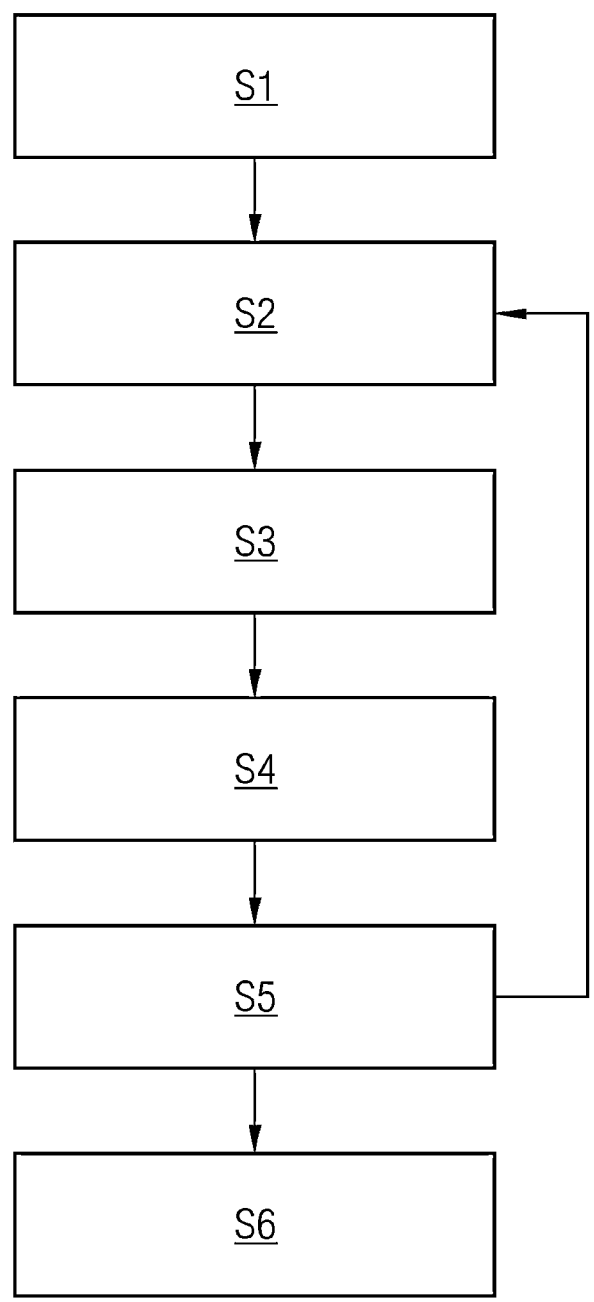

Some of the embodiments will be described in detail, with reference to the following figures, wherein like designations denote like members, wherein:

FIG. 1 shows a first embodiment;
FIG. 2 shows another embodiment;
FIG. 3 shows two users interacting with modules;
FIG. 4 shows a sketch of an architecture for a recommender system; and
FIG. 5 shows a workflow for building an engineering project.

DETAILED DESCRIPTION

In the following description, various aspects of embodiments of the present invention and embodiments thereof will be described. However, it will be understood by those skilled in the conventional art that embodiments may be practiced with only some or all aspects thereof. For purposes of explanation, specific numbers and configurations are set forth in order to provide a thorough understanding. However, it will also be apparent to those skilled in the conventional art that the embodiments may be practiced without these specific details.

The described components can each be hardware components or software components. For example, a software component can be a software module such as a software library; an individual procedure, subroutine, or function; or, depending on the programming paradigm, any other portion of software code that implements the function of the software component. A combination of hardware components and software components can occur, in particular, if some of the effects according to embodiments of the invention are exclusively implemented by special hardware (e.g., a processor in the form of an ASIC or FPGA) and some other part by software.

In the following, the term "component" is used for the components that perform the method, while the term "module" is used for the modules that are constituting the engineering project. Despite the dedicated use of these terms, both terms are simply referring to the generic concept of a module/component, which can be implemented in hardware, software, or a combination of both.

FIG. 1 shows one sample structure for computer-implementation of embodiments of the invention which comprise:

(101) computer system
(102) processor
(103) memory
(104) computer program (product)
(105) user interface In this embodiment of the invention the computer program product 104 comprises program instructions for carrying out the embodiments of the invention. The computer program 104 is stored in the memory 103 which renders, among others, the memory and/or its related computer system 101 a provisioning device for the computer program product 104. The system 101 may carry out embodiments of the invention by executing the program instructions of the computer program 104 by the processor 102. Results of embodiments of the invention may be presented on the user interface 105. Alternatively, they may be stored in the memory 103 or on another suitable means for storing data.

FIG. 2 shows another sample structure for computer-implementation of embodiments of the invention which comprises:

(201) provisioning device
(202) computer program (product)
(203) computer network/Internet
(204) computer system
(205) mobile device/smartphone In this embodiment the provisioning device 201 stores a computer program 202 which comprises program instructions for carrying out embodiments of the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

The embodiments shown in FIGS. 3, 4, and 5 can be implemented with a structure as shown in FIG. 1 or FIG. 2.

FIG. 4 shows an embodiment of the method and system that addresses a setting where a first user $u_1$ iteratively selects modules to configure an engineering project. After each step, a recommender system according to the embodiment proposes a set of items SI to the first user $u_1$ that complement items that have already been selected. In the example shown in FIG. 4, the recommended set of items SI is collected based on highest-ranking recommendation scores $s_{u_1,i}$ for a third item $i_3$, a second item $i_2$, and a first item $i_1$. According to the embodiment shown in FIG. 4, the recommender system consists of the following major components:

a user-item interaction graph G, containing network representations of observed user-item interactions, in particular representing each user of a set of users (as an example, FIG. 4 shows the first user $u_1$) and each item $i_1, i_2, i_3$ of a set of items with a node, and representing interactions between users and items by edges between the respective nodes, a parametrized feature encoder f (e.g., a feedforward neural network) that takes technical attributes $x_1, x_2, x_3$ of the items $i_1, i_2, i_3$ as input and produces initial item embeddings $e_i^0$ for each item $i_1, i_2, i_3$ which are a low-dimensional representation of the respective item $i_1, i_2, i_3$ in latent space, a graph neural network g (GNN) that produces updated user embeddings $e_u^L$ and updated item embeddings $e_i^L$ based on the user-item interaction graph G, a non-parametric decoder mapping h (e.g., given by the dot-product between the updated user embeddings $e_u^L$ and updated item embeddings et) that scores the likelihood of user-item-interactions.

The interplay of these components—in particular the composition of the mappings f, g, and h—form the proposed recommender system of the current and next embodiments. During training the parameters of the feature encoder f, the graph neural network g, and initial user embeddings (each representing one of the users in latent space) are tuned to fit the data stored in the user-item interaction graph G (i.e., observed interactions between users and items). After the training process, one can deploy these mappings and recommend items to users that produce the highest scores.

In particular, a user interface can output a set of items SI with the highest recommendation scores $s_{u_1,i}$ to the first user $u_1$. By interacting with the user interface, the user $u_1$ then chooses one of the items from the set of items SI. During engineering, the user $u_1$ incrementally builds the engineering project with his choices. After each choice, a new set of items SI is computed and presented to the user $u_1$. In the end, the engineering project is automatically completed with the last item selected by the user $u_1$. In addition, it is possible to automatically produce the engineering project, for example by printing the engineering project with a 3D printer, or by automatically assigning and configuring autonomous machines, in particular by installing and/or activating and/or configuring software modules, in order to realize the engineering project. In this case, the recommender system as shown in FIG. 4 is part of or connected to a larger automated system capable of performing the necessary additional steps of production and/or deployment of the engineering project.

In other words, the recommender system shown in FIG. 4 can be used not only for finalizing the engineering project, but also in earlier stages of building the engineering project, long before finalization, for example in an initial phase where only a few items are configured, or in a middle phase of the engineering process, or during the entire engineering process.

In the following, the previous embodiments as well as their architecture are described in more technical detail.

Basic Definitions

Consider the sets of n users $U=\{u_1, u_2, \ldots, u_n\}$ and m items $I=i_1, i_2, \ldots, i_m)$, respectively. We assume that $G=(V, E)$ is the undirected bipartite user-item interaction graph. That means the vertex set is given by $V=U \cup I$. $N_u$ denotes the set of items that a user u has interacted with. Similarly, $N_i$ denotes the set of users that have interacted with item i. Moreover, we draw an edge $\{u,i\} \in E$ if and only if user $u \in U$ has interacted with item $i \in I$.

We denote with $e_u^0 \in \mathbb{R}^d$ an initial user embedding of a generic user $u \in U$ (unless the opposite is stated, we assume that vectors correspond to column vectors), representing that generic user in latent space. In the beginning of the training process each initial user embedding $e_u^0$ is randomly initialized and subsequently tuned during the training process to fit the observed data. All initial user embeddings $e_u^0$ are assembled in an initial user embedding matrix $U^0 \in \mathbb{R}^{d \times n}$, where the i-th column is given by $e_{u_i}^0$. Each item $i \in I$ comes with a set of technical attributes $x_i \in \mathbb{R}^t$.

In this embodiment, the recommendation task consists of predicting the users' preferences towards new items given the user-item interaction graph G and the technical attributes of the items.

Our Method

In a first step, for each item $i \in I$, a feature encoder f produces an initial item embedding $e_i^0$ based on its technical attributes $x_i$. All initial item embeddings are assembled in an initial item embedding matrix $I^0 \in \mathbb{R}^{d \times m}$, where the j-th column is given by $e_{i_j}^0$.

Concretely, we have $e_i^0 = f(x_i)$, where $e_i^0 \in \mathbb{R}^d$ and $x_i \in \mathbb{R}^{Z_i}$. Note that $Z_i$ (i.e., the number of technical attributes that an item possesses) can differ between items (e.g., depending on their categories, items may have different types of technical attributes). This assumption induces additional constraints on the feature encoder f. In particular, we require that the feature encoder f can process a variable number of inputs and that the output should not depend on the order of the technical attributes contained in $x_i$. While there already exists some trainable mappings with these properties, we propose the following feature encoder: Assume that every entry of $x_i$, say the j-th entry $x_{i_j}$, indicates the value of a technical attribute denoted by $T_{i_j}$. For example, for an electronic component $x_{i_j}$ may indicate the electrical resistance measured in ohm. Next to numerical attributes, we also cover the case of one-hot-encoded, categorical attributes that are contained in the feature vector that constitutes the technical attributes $x_i$. For the i-th item, we build a weight matrix $W_i \in \mathbb{R}^{Z_i \times d}$, where the j-th row contains an embedding for the technical attribute $T_{i_j}$ that is shared among all items.

$$e_i^0 = x_i^T W_i,$$

Subsequently, an updated user embedding $e_u^1$ is produced, which is a context-aware embedding corresponding to a user $u \in U$ (and therefore also of the respective node in the user-item interaction graph G). The updated user embedding $e_u^1$ is calculated via $e_u^1 = g(e_u^0, N_u, I^0)$, where g is a graph neural network (GNN).

The graph neural network g can be implemented as a GCN as described in Kipf, Thomas N., and Max Welling, "Semi-supervised classification with graph convolutional networks", arXiv preprint arXiv:1609.02907, 2016. The entire contents of that document are incorporated herein by reference.

Alternatively, the graph neural network g can be implemented as a GAT as described in Velielović, Petar, et al. "Graph attention networks", arXiv preprint arXiv: 1710.10903, 2017. The entire contents of that document are incorporated herein by reference.

The graph neural network g assembles information from the neighborhood $N_u$ of the user, aggregates the corresponding item embeddings contained in $I^0$, and combines it with the initial user embedding $e_u^0$. Analogously, the graph neural network g produces updated item embeddings $e_i^1$ via $e_i^1 = g(e_i^0, N_i, U^0)$. Multiple layers of graph neural networks g can be stacked on top of each other to increase the expressiveness of the encoder mapping leading to updated user embeddings $e_u^L \in \mathbb{R}^d$ and updated item embeddings $e_i^L \in \mathbb{R}^d$, where $L \in \mathbb{N}$ denotes the number of GNN-layers.

To produce a recommendation score $s_{u,i}$ that indicates the likelihood that user u interacts with item i, the decoder mapping h simply computes the dot-product between the corresponding updated user embedding $e_u^L$ and updated item embeddings $e_i^L$ leading to $s_{u,i} = e_u^L \cdot e_i^L$. The idea is then to recommend the items with the largest scores to each user.

Training

The set of trainable parameters consists of the initial user embeddings $e_u^0$, the trainable parameters of the feature encoder f, and the parameters of the graph neural network g. During training items in the user-item interaction graph G are randomly deleted. The model is automatically tuned such that it produces high recommendation scores $s_{u,i}$ for the items were previously deleted. Concerning the training objective, all canonical loss functions that are typically employed in GNN-based recommendation systems are natural candidates. For example, the Personalized Ranking objective is given by $$L = -\Sigma_{u \in U} \Sigma_{i \in N_u} \Sigma_{j \neg \in N_u} \log(s_{u,i} - s_{u,j}).$$

That means, during training the trainable component of the architecture is adapted such that observed interactions (i.e., items $i \in N_u$) receive a higher score than unobserved interactions (items $j \neg \in N_u$).

Inference

Although the model has not been trained with the objective to cross boundaries between non-overlapping user groups, it pushes item representations (the updated item embeddings eh with similar technical attributes occurring in similar contexts to be close to each other. Therefore, during inference when a previously unseen and incomplete user-item interaction graph G' from one of the groups is shown to the model, it is capable of suggesting items from a separate user group that might be a better fit than any of the items in the current user's group.

FIG. 5 illustrates a setting in which any of the previously described embodiments can operate. In a first step S1, a user starts a configuration process of an engineering project, for example an industrial automation solution. In a second step S2, the recommender system according to the previously described embodiments proposes a set of modules that the user is likely to configure, based on previous interactions stored in the user-item interaction graph. In a third step S3, the user either selects modules from the recommendations computed in the previous step or selects any other module. In a fourth step, the selected module is added to the user-item interaction graph as a new interaction. In a fifth step, an updated user embedding of the user is computed via the graph neural network. The steps S2-S5 are repeated until the user stops the configuration process in a final step S6. Alternatively, the final step S6 can be used for automatic finalization of the engineering project and even automatic production/deployment of the engineering project, as described above.

For example, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for semi-automatic completion of an engineering project, comprising the following operations, wherein the operations are performed by components, and wherein the components are software components executed by one or more processors and/or hardware components:

storing, in a database,
  a set of items, I, with each item, $i \in I$, having technical attributes, $x_i$, and with each item representing a module, and with each module being a hardware module and/or software module that can be used in an engineering project of a first user, $u_1$,
  a current state of the engineering project, with the current state including items that the first user, $u_1$, has already selected, and
  a user-item interaction graph
    representing each user, u, of a set of users, U, and each item, i, of the set of items, I, with a node, and
    representing observed interactions between users and items by edges between the respective nodes,
producing, by a feature encoder retrieving the technical attributes, $x_i$, of each item, i, from the database, an initial item embedding, $e_i^0$, for each item, i, which is a latent representation of the respective item, i, in latent space, with all of the initial item embeddings, $e_i^0$, forming an initial item embedding matrix, $I_0$,
processing, by a graph neural network operating on the user-item interaction graph,
  an initial user embedding for the first user, $e_{u_1}^0$,
  a first user neighborhood, $N_{u_1}$, and
  the initial item embedding matrix, $I^0$,
as input to compute an updated user embedding for the first user, $e_{u_1}^L$,
  with the initial user embedding of the first user $e_{u_1}^0$ being a latent representation of the first user, $u_1$, in latent space,
  with the first user neighborhood, $N_{u_1}$, being a set of items that the first user, $u_1$, has interacted with,
processing, by the graph neural network operating on the user-item interaction graph,
  each initial item embedding, $e_i^0$,
  a neighborhood for each item, $N_i$, and an initial user embedding matrix, $U^0$,
as input to compute updated item embeddings, $e_i^L$,
with the neighborhood for each item, $N_i$, being a set of users that have interacted with the respective item, i,
with the initial user embedding matrix, $U^0$, being formed by initial user embeddings, $e_u^0$, for each user, u, which are latent representations of the respective user, u, in latent space, processing, by a decoder mapping, the updated user embedding for the first user, $e_{u_1}^L$, and the updated item embeddings, $e_i^L$, as input in order to compute a recommendation score $s_{u_1,i}$ for each item, i, indicating a likelihood that the first user, $u_1$, needs the respective item, i, for completing his engineering project, forming a set of items by selecting items with the highest recommendation score $s_{u_1,i}$, outputting, by a user interface, the set of items to the first user, $u_1$, recognizing, by the user interface, a user interaction selecting an item from the set of items, and automatically completing the engineering project by adding the selected item to the current state of the engineering project in the database.

2. The method of claim 1,
with the additional step of automatically producing the engineering project,
by printing the engineering project with a 3D printer, or
by automatically assigning and configuring autonomous machines, by installing and/or activating and/or configuring software modules, in order to realize the engineering project.

3. The method according to claim 1, with the initial steps of:
randomly initializing each initial user embedding $e_u^0$, and
randomly deleting items, i, during a training phase in the user-item interaction graph, and optimizing the initial user embeddings, $e_u^0$, trainable parameters of the feature encoder, and parameters of the graph neural network according to a training objective, in order to produce high recommendation scores, $s_{u,i}$, for the deleted items.

4. The method according to claim 1,
wherein the decoder mapping computes the recommendation scores, $s_{u_1,i}$ as the dot-product of the updated user embedding for the first user, $e_{u_1}^L$, and the updated item embeddings, $e_i^L$.

5. The method according to claim 1,
wherein the engineering project is an industrial engineering project.

6. The method according to claim 5,
wherein the industrial engineering project is an automation system.

7. The method according to claim 1,
wherein the graph neural network consists of one or more layers, with each layer being a graph neural network.

8. A system for semi-automatic completion of an engineering project, comprising the database, the feature encoder, the graph neural network, and the decoder mapping according to claim 1, wherein at least some of these components are hardware components, and wherein all of these components are configured for the execution of the respective operations.

9. A computer program product, comprising a computer readable hardware storage device having computer readable program code stored therein, the program code being executable by a processor of a computer system to implement instructions for carrying out the method of claim 1.

10. A provision device for the computer program product according to claim 9, wherein the provision device stores and/or provides the computer program product.

* * * * *